(12) United States Patent
Isherwood et al.

(10) Patent No.: US 7,179,393 B2
(45) Date of Patent: Feb. 20, 2007

(54) METHODS OF MANUFACTURING SUBSTRATES

(75) Inventors: Roland Isherwood, Whitchurch (GB); Lawrence George Commander, Berkshire (GB)

(73) Assignee: De La Rue International, Ltd., Basingstoke (GB)

( * ) Notice: Subject to any disclaimer, the term of this patent is extended or adjusted under 35 U.S.C. 154(b) by 413 days.

(21) Appl. No.: 10/502,097

(22) PCT Filed: Jan. 22, 2003

(86) PCT No.: PCT/GB03/00218

§ 371 (c)(1),
(2), (4) Date: Jul. 26, 2004

(87) PCT Pub. No.: WO03/061980

PCT Pub. Date: Jul. 31, 2003

(65) Prior Publication Data

US 2005/0118396 A1 Jun. 2, 2005

(30) Foreign Application Priority Data

Jan. 25, 2002 (GB) ................................. 0201767.1
Apr. 4, 2002 (GB) ................................. 0207831.9

(51) Int. Cl.
*C30B 33/00* (2006.01)
*B42D 15/00* (2006.01)
(52) U.S. Cl. ......................................... 216/23; 283/83
(58) Field of Classification Search .................. 216/23, 216/22; 283/82, 83, 72, 94, 96
See application file for complete search history.

(56) References Cited

U.S. PATENT DOCUMENTS

| 4,943,093 | A | 7/1990 | Melling et al. |
| 5,678,863 | A | 10/1997 | Knight et al. |
| 6,052,137 | A | 4/2000 | Shimada |
| 6,318,758 | B1 | 11/2001 | Stenzel et al. |
| 2003/0012935 | A1 | 1/2003 | Kuntz et al. |

FOREIGN PATENT DOCUMENTS

| EP | 0911758 | 4/1999 |
| WO | 0039391 | 7/2000 |

OTHER PUBLICATIONS

Title page to WO 00/72056, dated May 2000, of Gocho et al. entitled "Laminated Composite Body, Information Recording Medium . . . "

*Primary Examiner*—Parviz Hassanzadeh
*Assistant Examiner*—Roberts Culbert
(74) *Attorney, Agent, or Firm*—Dykema Gossett PLLC

(57) ABSTRACT

The present invention relates to improvements in methods of manufacture of substrates which can be used in varying shapes and sizes for various authenticating or security applications, which combine the advantages of indicia formed from metallisation or demetallisation of a security element and the colorshift effects of liquid crystal materials. The invention therefore provides a method of manufacturing a substrate comprising the steps of applying a darkly colored resist to at least a part of a metallic layer on one side of a substantially transparent polymeric film, removing metal from areas not covered by the resist to form demetallised regions and applying a polymeric liquid crystal material over the resist and the demetallised regions.

24 Claims, 5 Drawing Sheets

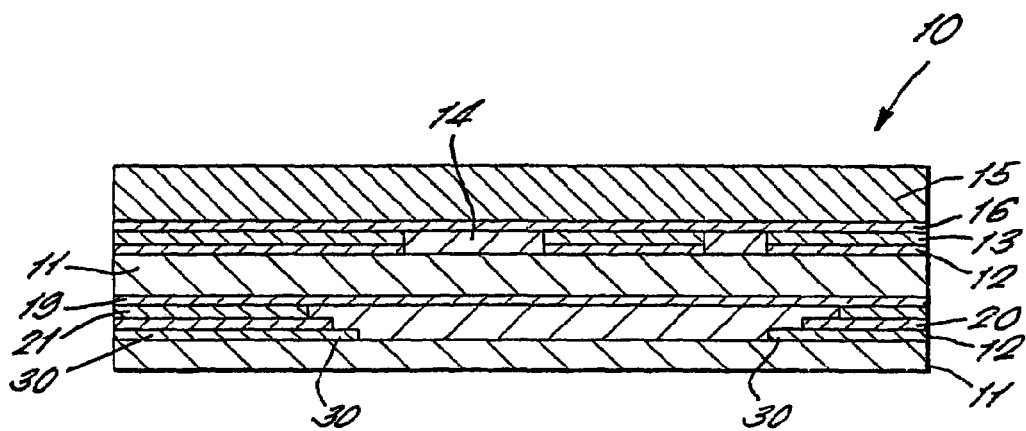
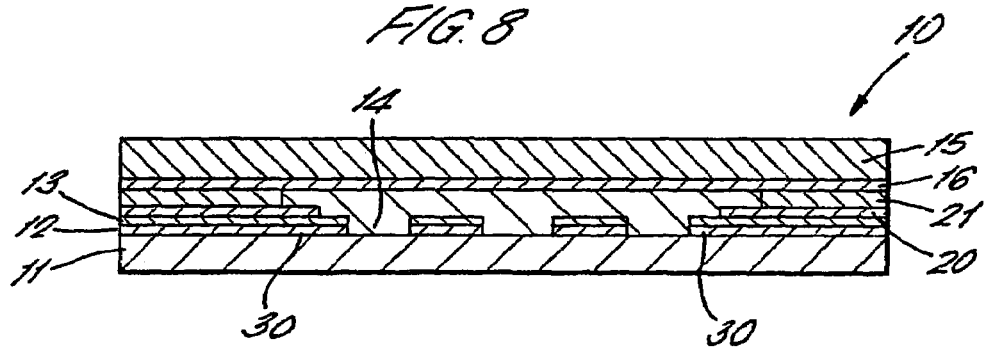

METHODS OF MANUFACTURING SUBSTRATES

The present invention relates to improvements in methods of manufacture of substrates which can be used in varying shapes and sizes for various authenticating or security applications, which combine the advantages of indicia formed from metallisation or demetallisation of a security element and the colour shift effects of liquid crystal materials.

The increasing popularity of colour photocopiers and other imaging systems and the improving technical quality of colour photocopies has led to an increase in the counterfeiting of bank notes, passports and identification cards etc. There is, therefore, a need to add additional authenticating or security features to existing features. Steps have already been taken to introduce optically variable features into such documentation which cannot be reproduced by a photocopier. There is also a demand to introduce features which are discernible by the naked eye but which are "invisible" to, or viewed differently, by a photocopier. Since a photocopying process typically involves scattering high energy light off an original document containing the image to be copied, one solution would be to incorporate one or more features into the document which have a different perception in reflected and transmitted light, an example being watermarks and enhancements thereof.

It is known that certain liquid crystal materials exhibit a difference in colour when viewed in transmission and reflection as well as an angularly dependent coloured reflection. Liquid crystal materials have been incorporated into documents, identification cards and other security elements with a view to creating distinctive optical characteristics. EP-A-0435029 is concerned with a data carrier, such as an identification card, which comprises a liquid crystal polymer layer or film in the data carrier. The liquid crystal polymer is in solid form at room temperature and is typically within a laminate structure. The intention is that the liquid crystal layer, which is applied to a black background, will demonstrate a high degree of colour purity in the reflected spectrum for all viewing angles. Automatic testing for verification of authenticity is described using the wavelength and polarisation properties of the reflected light in a single combined measurement. This has the disadvantage of being optically complex using a single absolute reflective measurement requiring a uniform liquid crystal area on a black background. AU-488,652 is also concerned with preventing counterfeit copies by introducing a distinctive optically-variable feature into a security element. This patent discloses the use of a liquid crystal "ink" laminated between two layers of plastic sheet. The liquid crystal is coated on a black background so that only the reflected wavelengths of light are seen as a colour. The patent is primarily crystals which have the characteristic of changing colour with variation in temperature.

Cholesteric liquid crystals have certain unique properties in the chiral nematic phase. It is the chiral nematic phase which produces an angularly dependent coloured reflection and a difference in colour when viewed in either transmission or reflection. Cholesteric liquid crystals form a helical structure which reflects circularly polarised light over a narrow band of wavelengths. The wavelength is a function of the pitch of the helical structure which is formed by alignment within the liquid crystal material. An example of such a structure is depicted in FIG. 1 with the cholesteric helical axis in the direction of the arrow X. The reflection wavelength can be tuned by appropriate choice of chemical composition of the liquid crystal. The materials can be chosen to be temperature sensitive or insensitive. Both handednesses of circularly polarised light can be reflected by choice of the correct materials and thus high reflectivities at specific wavelengths can be achieved with double layers of liquid crystals. The wavelength of reflected light is also dependent on the angle of incidence, which results in a colour change perceived by the viewer as the device is tilted (FIG. 2).

On a dark background, only the reflective effect is observed, since little light is being transmitted from behind. When the dark background is removed or not present and the device is viewed in transmission, the intensity of the transmitted colour swamps the reflective colour.

Of the light which is not reflected, a small proportion is absorbed and the remainder is transmitted through the liquid crystal material 3. When correctly configured there is a dramatic change between the transmitted colour in the direction of arrow Y and reflected colour in the direction of arrow Z (FIG. 3). The region on either side of the liquid crystal layer 3 in FIG. 3 is a transparent polymer or glass. To achieve this effect the area of the substrate which is occupied by the liquid crystal must be transparent or translucent. The transmitted and reflected colours are complementary, for example, a green reflected colour produces a magenta transmitted colour.

In the field of banknotes, and security elements or threads in particular, the use of demetallised indicia such as described in EP-A-319157 has proved to be highly effective in reducing counterfeiting. However, in the security business it is always advantageous to continually strive to find new and further improved anti-counterfeit security features. It is desired to use the highly advantageous characteristics of demetallised characters and colour shift effects from liquid crystal materials.

According to the invention there is provided a method of manufacturing a substrate comprising the steps of applying a darkly coloured resist to at least a part of a metallic layer on one side of a substantially transparent polymeric film, removing metal from areas not covered by the resist to form demetallised regions and applying a polymeric liquid crystal material over the resist and the demetallised regions.

The invention also provides a substrate made by this method.

A preferred embodiment of the present invention will now be described, by way of example only, with reference to the accompanying drawings in which:

FIG. 7 is a cross section of a further embodiment of substrate 10 forming part of a laminated structure;

FIG. 8 is a cross section of a yet further embodiment of substrate 10.

Figure 1:
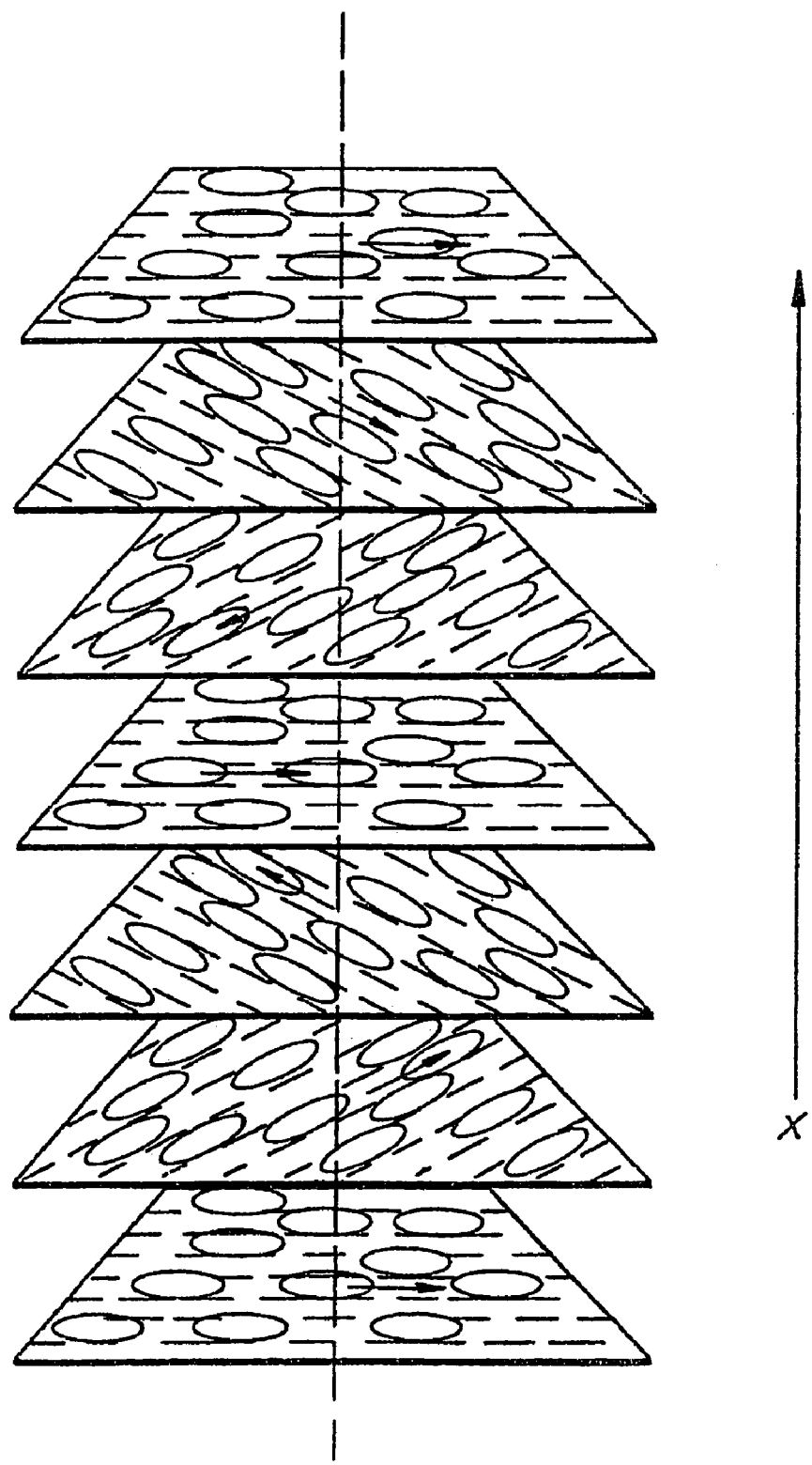
FIG. 1 depicts chiral nematic alignment of a cholesteric liquid crystal material.
Figure 2:
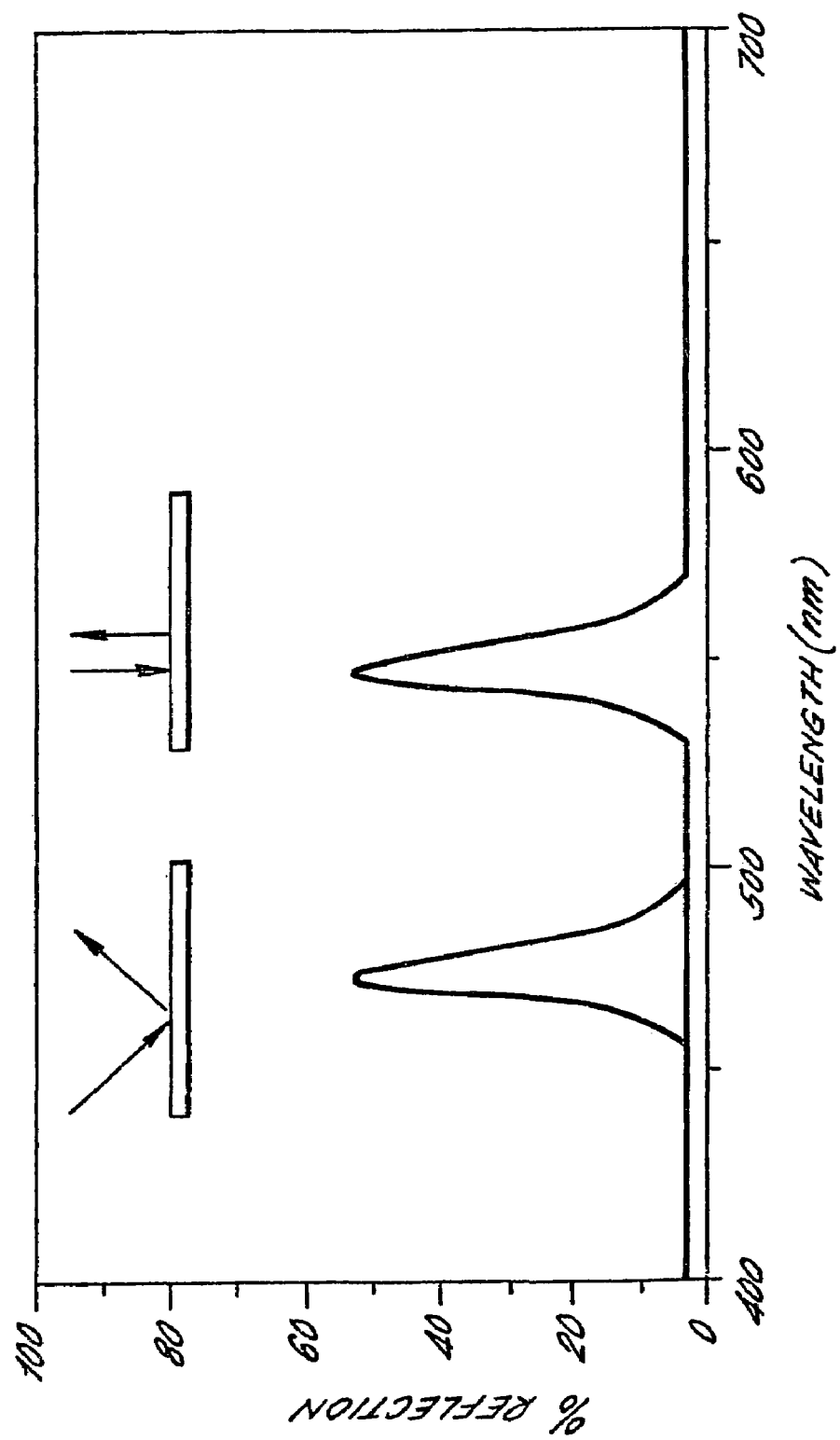
FIG. 2 shows how the reflection from a cholesteric liquid crystal material varies with the angle of incidence.
Figure 3:
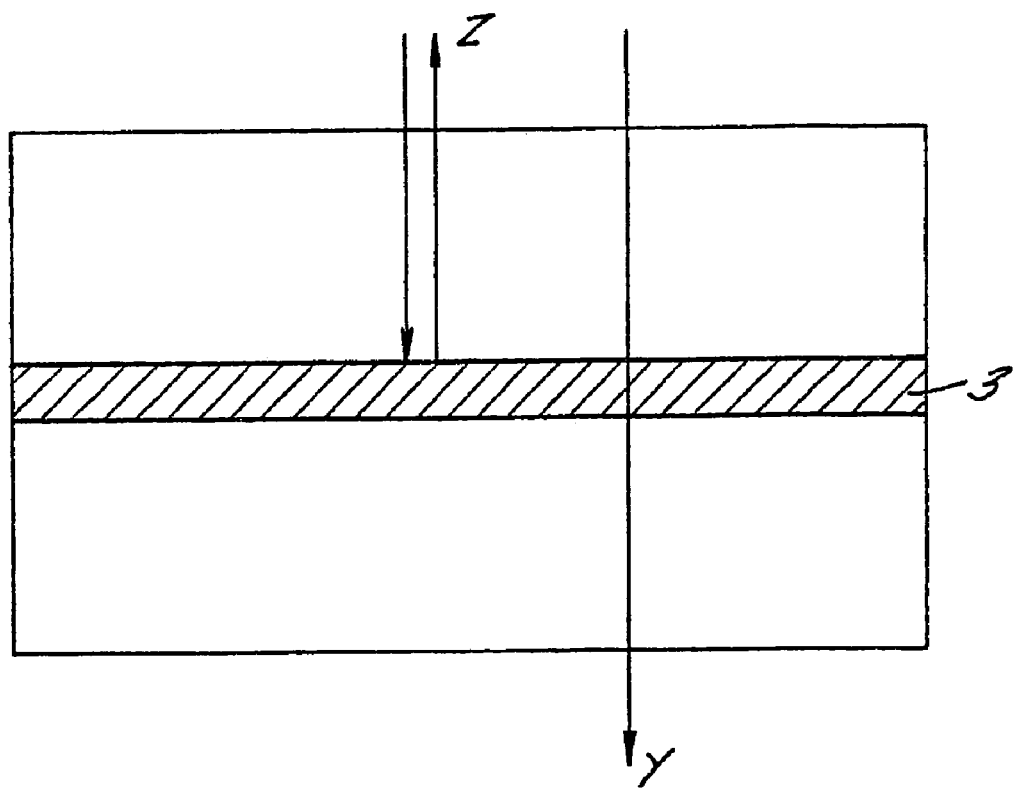
FIG. 3 depicts the transmission and reflection of light incident on a liquid crystal material.

FIGS. 1 to 3 have already been described in detail as background to the present invention.

Figure 4:
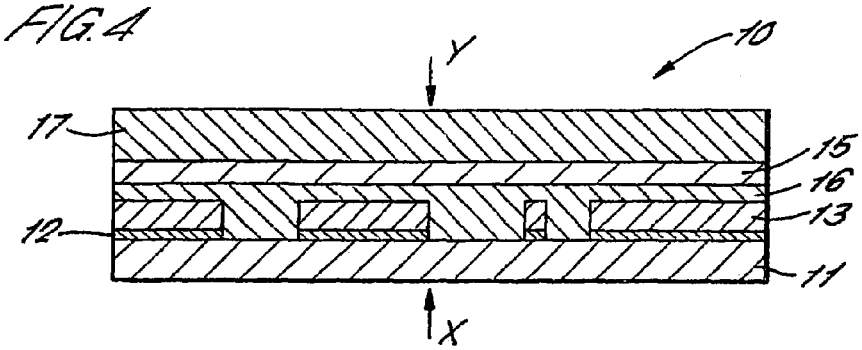
FIGS. 4 and 5 are cross sections across the width of two alternate elongate authenticating device formed by the present invention.

Referring now to FIG. 4, there is illustrated a substrate 10 formed by the method of the present invention for use in security or authenticating devices. The method requires a metallised film comprising a substantially clear polymeric film 11 of PET or the like, which has an opaque layer of metal 12 on a first side thereof. A suitable pre-metallised film is metallised MELINEX S film from DuPont of preferably 19 μm thickness.

The metal layer 12 is printed with a resist 13 which contains a black or dark dye or pigment. Suitable resists include the dye BASF Neozapon X51 or the pigment. (well dispersed) "Carbon Black 7" mixed into a material with both good adhesion to metal and caustic resistance. The dye loading can be up to 50% (by weight) of the final coat of resist 13 depending on coat thickness and desired blackness. An example of a class of suitable resist materials is vinyl chlorides/vinyl acetate copolymers such as Union Carbide Ucar resins, Sun VHL 31534, or Wacker Vinnol E 15/45m. The printed metallised film 11 is then partially demetallised, according to a known demetallisation process using a caustic wash which removes the metal in the regions not printed with the resist 13. The remaining regions coated with resist 13 provide a black layer which is visible when the demetallised film 11 is viewed from its first side (along arrow Y) interspersed with clear regions. The shiny metal of the remaining parts of the metallic layer 12 are only visible from an opposite side of the demetallised film 11 (along arrow X). The resist 13 may be printed in the form of the indicia 15 (see FIG. 6) such as words, numerals, patterns and the like; in which case the resulting indicia 14 will be positively metallised, with the metal still covered by the dark or black resist 13. Alternatively the resist 13 may be printed so as to form indicia negatively, in which case the resulting indicia 14 will be provided by the demetallised regions. The indicia 14, however formed, are clearly visible from both sides, especially in transmitted light, due to the contrast between the regions of the metal which have been removed and the remaining opaque regions.

A layer 15 of polymeric liquid crystal material is then coated, transferred or laminated to the demetallised film 11 over the remaining parts of the black resist layer 13 and the demetallised regions. This has the effect of producing a highly visible colour shift effect when the finished substrate 10 is viewed in reflection from the first side (along arrow Y); and a metallic shiny partial coating when viewed from the other side (along arrow X). Additionally clear positive or negative indicia 14 can be seen in transmission from either side. A layer of a suitable adhesive 16 may be required, for this process, applied between the black resist layer 13 and the liquid crystal layer 15.

When the aforementioned substrate 10, or a strip or thread made therefrom, is included in paper, the remaining metal of layer 12 is not directly visible. It is hidden either by the masking coat of resist 13 or the paper, to which it provides opacity, thereby enabling the contrast between the demetallised and metallised areas to be clearly seen.

If a metallic effect is not desired, when viewed from the back of the paper, an additional masking coat may be used as well as the black layer of resist 13 and a suitable material for such a masking coat would be Coates 3188XSN or Coates Heliovyl White S90 353. A typical coat weight is suggested to be in the region of 2 GSM.

Whilst the use of a black, or very dark dye, may give rise to the most strong colour shift effects, other effects may be generated by the use of a dyed resist of other colours or a combination of colours giving rise to differing apparent colour shift colours.

Optionally, a further protective layer 17 may be laminated to or coated over the liquid crystal layer 15. Such a layer 17 may be a PET laminate or an anti-scratch coating. A suitable anti-scratch coating would be Wacker Vinnol E 15/45M.

The black dye or pigment in the resist 13 may be a conducting material, such as carbon black, to produce a machine-readable or conducting layer. Alternatively it may be a magnetic material, such as magnetite, to produce a machine readable magnetic layer. The layers may be continuous or discontinuous and may be of the forms described in EP-A-0516790 or WO-A-9825236 for example.

Figure 5:
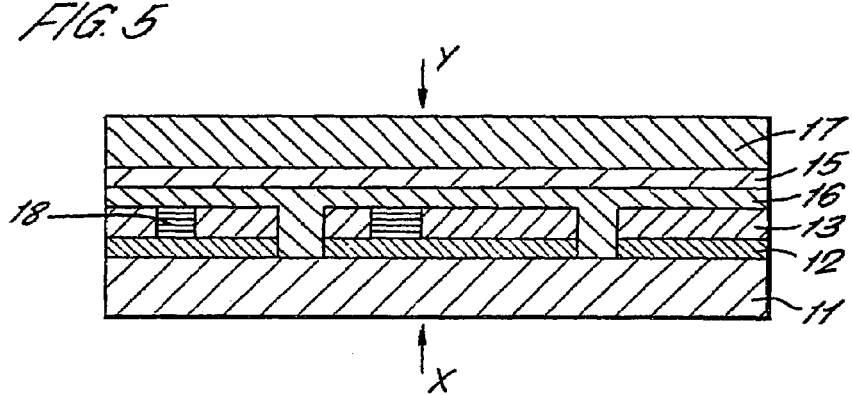
Figure 6:
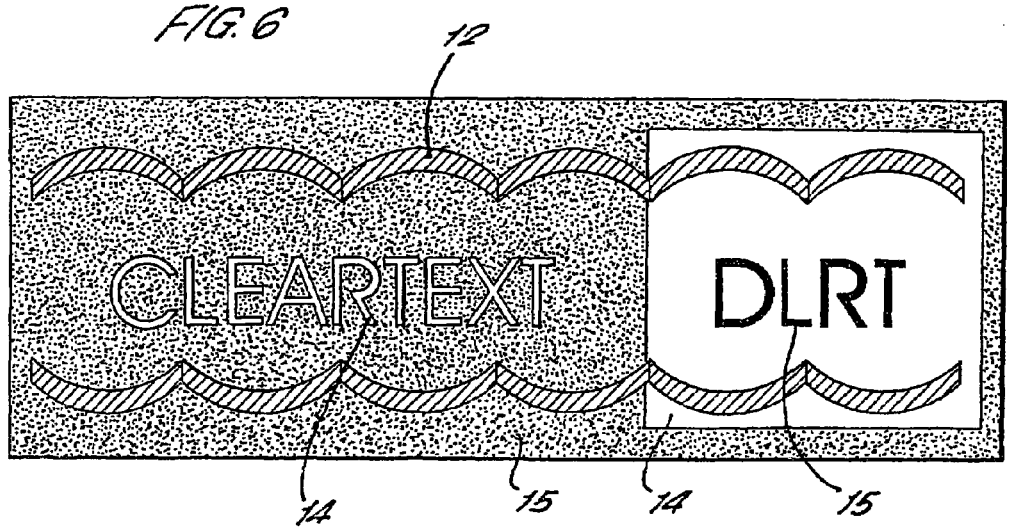
FIG. 6 is a plan view of the elongate authenticating device of FIG. 5.

In a further embodiment of the invention shown in FIG. 5, only some parts of the layer of resist 13 contain a dark dye or pigment and some parts 18 are substantially clear containing low concentrations of, or no, dye/pigment. When viewed from the first side (along arrow Y), the metal of the metallic layer 12 can clearly be seen in the regions of remaining clear resist 18, unaffected by the liquid crystal layer 17. The colour shift effect can only be seen in the darkly coloured resist regions 13. This is shown in FIG. 6.

The clear resist regions 18 may also contain a fluorescent, luminescent or phosphorescent material so that, whilst the metallic layer 12 can be seen as metallic in normal lighting in those regions, under UV lighting the regions 18 have a definite colour.

Fluorescent materials may be used in separate layers of coatings of the resist. For example, a fluorescent material may be provided in the form of a separate layer of coating over the top of the resist regions 13, 17. Alternatively a fluorescent material may be provided as a separate layer of coating on the back (second side) of the substrate 10 (over the surface of film 11 opposite to the metallised surface). Where a fluorescent material is present in the clear resist regions 18 and a coating is applied to the front or back of the substrate 10 the colour at which that fluorescent material fluoresces may be the same or different to that at which the material used in the coating fluoresces, to obtain different visual effects. A fluorescent material may also be present in the dark resist regions 13, the colour at which that material fluoresces being the same or different to that at which a fluorescent material in the clear resist regions 17 and/or in the coatings on the front or back fluoresce.

Additionally, in the regions 18 where the metal is visible under the clear resist 18 a holographic structure can be incorporated into the metallic layer.

Another effect provided by the invention is that, when viewed off-axis, the colour of the liquid crystal changes slightly as the substrate 10 is rotated. When the substrate is overcoated with an adhesive or anti-scratch coating the colour change is reduced. A water based adhesive, such as a vinyl acetate emulsion, would be suitable. Thus, if the adhesive/anti-scratch coating is applied in the form of a pattern or design, then the coated/uncoated regions can appear as different colours off-axis. When the uncoated regions change colour on movement of the element 10 the contrast is seen more clearly.

Another effect which can be usefully used is that, when the substrate 10 is stretched, it changes colour (irreversibly). The colour goes to longer wavelengths (eg green goes to red) and retains its colour shifting capability (eg red now goes to green off-axis).

The use of fluorescent, luminescent or phosphorescent materials in the clear parts 18 of the layer of resist 13 enable interesting effects to be produced.

The substrate 10 produced by this method can be slit or cut into patches, foils, stripes, strips or threads for incorporation into plastic or paper substrates in accordance with known methods. Whilst these are preferably partially embedded into a paper or plastic substrate, they may be applied to a substrate or wholly embedded within.

It will be further understood by those skilled in the art that the proposed method could be used in combination with existing approaches for the manufacture of thread. Examples of suitable constructions that can be used include, but are not limited to, those cited within EP-A-516790, WO-A-9825236, and WO-A-9928852. FIG. 7 illustrates how substrate 10 can be enhanced by laminating the basic structure described above to a further structure and FIG. 8 shows a more integrated approach.

FIG. 7 shows a second machine-readable construction laminated to the basic structure. The machine-readable construction comprises a polymeric film 11, such as a metallised 12 μm PET base 11, which has been selectively demetallised. In this example two "tramlines" 30 of metal 12 have been left along each edge of the construction but other variants are possible as illustrated within the cited prior art. The "tramlines" 30 are such that when the final construction is laminated to substrate 10 they are coincident with only metallised regions. A protective layer 20 may be applied onto the "tramlines" 30 to prevent the metal being corroded by the magnetic layer 21, which is applied next. The magnetic material is only applied over the tramlines 30 so as not to obscure the indicia formed with the substrate 10. A suitable protective layer 20 is VHL31534 supplied by Sun Chemical applied with coat weight of 2 gsm. A suitable magnetic material 21 is FX 1021 supplied by Ferron applied with a coat weight of 2–6 gsm. On to this a suitable laminating adhesive 19 is applied, this may be the same as for layer 16 in the previous constructions. The whole construction is then laminated to the basic structure comprising layers 11, 12, 13, 16, 15 to form the final substrate 10. If a high durability substrate 10 is required it may be preferable to apply a further laminate layer onto the polymer liquid crystal layer as described in previous examples.

FIG. 8 shows another alternative approach to forming a machine-readable construction of substrate 10. Here a 12 μm metallised PET base layer 11 is demetallised with a suitable design 12 again ensuring tramlines 30 are left along each edge of the thread. As described above a black resist 13 is used during the demetallisation process. On to a coloured, preferably black, resist 13 a protective layer 20 may be applied prior to application of a magnetic layer 21. The protective layer 20 may optionally be pigmented. Suitable materials and coat weights are as described for FIG. 7. Finally a layer of polymer liquid crystal 15 is laminated on to the top using a laminating adhesive 16 as previously described.

In both the examples above the magnetic material 21 is applied as tramlines along both edges of the thread. It should also be noted that the magnetic material 21 could be applied to any of the examples described herein in any manner so long as it does not obscure the demetallised regions and consequently obscure the indicia 14. Preferably the magnetic material is applied over the resist 13,17 or on the back of the film 11. Various alternative constructions can be used.

The substrate 10, or security thread made therefrom, described in any of the above embodiments may be used in security paper such as bank notes.

The invention claimed is:

1. A method of manufacturing a substrate comprising the steps of applying a resist to at least a part of a metallic layer on a first side of a substantially transparent polymeric film, removing metal from areas not covered by the resist to form demetallised regions, and applying a layer of polymeric liquid crystal material over the resist and the demetallised regions, wherein the resist is darkly colored so as to mask the underlying metal areas and give rise to a color shift effect in the areas covered by the polymeric liquid crystal material, and wherein the contrast between the metalized and de-metalized regions can be clearly distinguished.

2. A method as claimed in claim 1 in which the resist contains a dye or pigment, which is black.

3. A method as claimed in claim 1, further comprising the step of applying a substantially clear resist to at least another part of the metallic layer.

4. A method as claimed in claim 1 in which the removal of metal de-metallization process is carried out with a caustic wash.

5. A method as claimed in claim 1 in which negative indicia are formed by the de-metalized regions.

6. A method as claimed in claim 1 in which positive indicia are formed by the resist-covered regions.

7. A method as claimed in claim 1 in which the polymeric liquid crystal layer is applied by a coating process.

8. A method as claimed in claim 1 in which the polymeric liquid crystal layer is applied by a transfer process.

9. A method as claimed in claim 1 in which the polymeric liquid crystal layer is applied by a lamination process.

10. A method as claimed in claim 1 in which the resist incorporates a conducting material to produce a machine-readable conducting layer.

11. A method as claimed in claim 1 in which the resist incorporates magnetic material to produce a machine-readable magnetic layer.

12. A method as claimed in claim 1 in which magnetic material is located in a continuous or discontinuous layer over the resist.

13. A method as claimed in claim 1 in which magnetic material is located in a continuous or discontinuous layer on a second side of the polymeric film.

14. A method as claimed in claim 1 in which the resist comprises a plurality of different colors.

15. A method as claimed in claim 1 in which a holographic structure is incorporated into the metal layer.

16. A method as claimed in claim 1 in which fluorescent, luminescent and/or phosphorescent material is incorporated in the resist.

17. A method as claimed in claim 1 in which a fluorescent, luminescent and/or phosphorescent material is incorporated in the clear resist.

18. A method as claimed in claim 1 in which a fluorescent material is incorporated in a layer over the resist.

19. A method as claimed in claim 1 in which a fluorescent material is incorporated in a layer on a second side of the film.

20. A method as claimed in claim 1 further comprising the step of laminating to a second side of the film a machine readable construction having a partially metalized or de-metalized polymeric film having a continuous strip of metal along each edge coincident with resist covered metal regions, in which a magnetic material is present in the continuous strips.

21. A substrate formed by the method of claim 1.

22. A patch, foil, stripe, strip or thread formed from the substrate of claim 21.

23. Security paper incorporating one or more of the patch, foil, stripe, strip or thread of claim 22.

24. A bank note made from the security paper of claim 23.

* * * * *